No. 854,853. PATENTED MAY 28, 1907.
T. W. SPELLMAN.
BEVEL, PROTRACTOR, AND SQUARE.
APPLICATION FILED SEPT. 29, 1904.
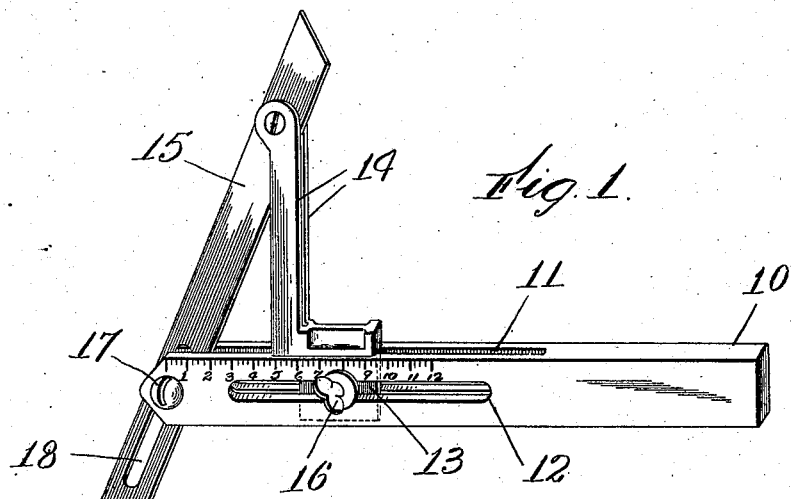
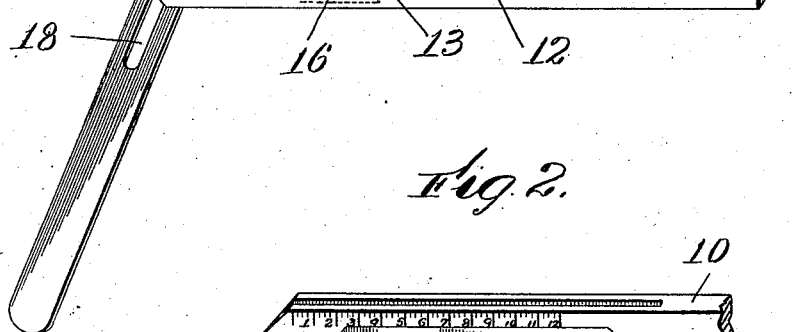
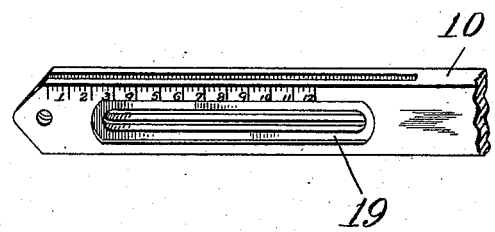
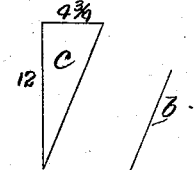
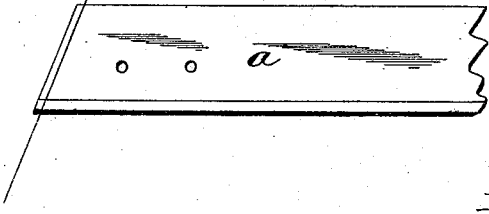

UNITED STATES PATENT OFFICE.

THOMAS W. SPELLMAN, OF WORCESTER, MASSACHUSETTS.

BEVEL, PROTRACTOR, AND SQUARE.

No. 854,853.   Specification of Letters Patent.   Patented May 28, 1907.

Application filed September 29, 1904. Serial No. 226,506.

*To all whom it may concern:*

Be it known that I, THOMAS W. SPELLMAN, a citizen of the United States, residing at Worcester, in the county of Worcester and State of Massachusetts, have invented a new and useful Bevel, Protractor, and Square, of which the following is a specification.

This invention relates to a bevel or tool for laying out angles.

The especial object of this invention is to provide a compact, simple, efficient and inexpensive tool for laying out angles when figured to a common base line.

A bevel constructed according to this invention has been especially designed for use in marking out pieces of structural iron work or the templet boards which are used in cutting and drilling the same.

To these ends, this invention consists of the bevel as an article of manufacture, and of the combinations of parts therewith as hereinafter described and more particularly pointed out in the claims at the end of this specification.

In the accompanying drawing, Figure 1 is a perspective view of a bevel or tool constructed according to this invention. Fig. 2 is a detail view showing a slightly modified construction, Fig. 3 is a fragmentary view illustrating the character of the work in connection with which the bevel is employed, and Fig. 4 shows the manner of charting or drawing the angle to which a beam or templet-board is to be cut.

In cutting to proper length and punching the holes in the pieces or beams employed in structural iron-work, care has to be exercised in cutting the ends of the pieces at exactly proper angles. In many classes of structural iron-work, particularly in the construction of trusses and in the construction of bridges, the ends of the beams or pieces have to be cut at widely varying angles. In laying out work of this character it was formerly customary to figure these angles in degrees, minutes and seconds. That is to say, these angles were formerly figured to fractions of a circle, and graduated protractors or arcs were employed in laying out the work. More recently, however, in laying out work of this kind, it has become a nearly universal custom to figure the different angles to a base-line of known length. That is to say, in the drawings for structural iron work the various angles are now ordinarily indicated by means of small right-angle triangles, one side of each of which is twelve units in length, while the other side is of proper length to subtend the desired angle at the apex of the triangle. In laying out work from drawings of this character where several duplicated pieces are to be cut and punched, it is customary to make a templet-board for scribing the ends of a beam or other piece of metal to be cut, and for marking the spots for boring the bolt-holes. Where a single piece is to be cut and punched, the work is sometimes scribed and laid out directly upon the iron itself. In either case in order to lay out and scribe the proper angle either directly upon the iron or upon the templet-board, it is now customary for the workman to use an ordinary two-foot square, such as employed by carpenters, and to lay a straight edge from the twelve inch mark on one leg of the square to a graduation of the proper number of inches or fractions of an inch upon the other leg of the square. From an angle thus determined the workman then usually sets the tipping arm of an ordinary bevel from which the work is scribed to proper scale. In laying out work in this manner the workman employs three separate instrumentalities, to wit; the square, straight-edge, and bevel, and in the use of these instrumentalities there is a considerable liability of inaccuracy. A tool constructed according to my invention is especially designed for work of this class, and is intended to give any desired angle which is figured to a base line by a single, direct and simple adjustment.

Referring to the accompanying drawing and in detail, a bevel constructed according to this invention, as herein illustrated, comprises a main arm or member 10 which is graduated along its edge, and is slotted as at 11. Extending transversely with respect to the slot 11 is an adjusting slot 12. Longitudinally movable upon the main graduated arm 10 is a bracket or base-line arm. Extending down from the bracket or base-line arm is a flange 13 which fits into the slot 11, and extending up from the bracket are arms 14 having a pin or screw for pivotally supporting the tilting arm 15. Threaded into the flange 13 and carrying a clamping washer is a wing-bolt 16. The tilting arm 15 is slotted as at 18, to engage an end-pin or screw 17.

In some cases where it is desired to provide a construction without obstruction on either face, the main graduated arm may be countersunk or chambered out as at 19, as shown in Fig. 2, to receive the adjusting wing-bolt 16.

In the construction of a bevel or tool for laying out angles figured to a base line of twelve units, the vertical distance separating the pivot of the tilting member 15 to the base-line arm and the pivotal point connecting the tilting arm with the main arm is equal to twelve units of the scale to which the main arm is graduated.

In Fig. 3 *a* indicates a templet board or the iron itself cut off at *b*, on an angle which is drawn on the chart *c* in Fig. 4.

In the use of the bevel as thus constructed, by sliding the base-line arm to different positions, the angular adjustment of the tilting arm may be made to correspond to any desired angle, for example, if a length of four and three-quarters inches is required to subtend the angle illustrated in Fig. 4, when figured to a base-line of twelve inches, by setting the base-line arm to the position illustrated in Fig. 1, the tilting arm will be given the required inclination, and the parts may be clamped in this position by the fastening bolt, so that the bevel can be directly used for laying out the templet-board or directly upon the iron itself, as desired.

I am aware that numerous changes may be made in the construction of a bevel without departing from the scope of this invention as expressed in the claims. I do not wish, therefore, to be limited to the construction I have herein shown and described, but What I do claim and desire to secure by Letters Patent of the United States is:—

1. As an article of manufacture, a bevel comprising a main arm having a graduated scale thereon, a base line arm having a sliding connection with the main arm and held perpendicular thereto in all positions thereof, means for clamping the base line arm in any position along said scale, and a tilting straight edge connected with the end of the base line arm by a fixed pivotal connection and with the end of said main arm by a freely sliding pivotal connection, said base line arm having a constant unadjustable length equal to a definite and predetermined number of units of the scale on the main arm.

2. As an article of manufacture, a bevel for the linear measurement of angles, comprising a main arm having graduations and longitudinal slots, an adjusting piece or bracket mounted in said slots, a clamp-nut and screw for holding the adjusting piece in different positions, a base line arm extending from the adjusting piece, a tilting piece or straight edge pivoted to the end of the base line arm with a pin-and-slot connection to the main arm, said parts being so proportioned that the distance from the pivot of the straight edge at the end of the base line arm to a line drawn longitudinally with respect to the main arm through the supporting pin of the straight edge will be equal to twelve units of the scale of graduations on the main arm.

In testimony whereof I have hereunto set my hand, in the presence of two subscribing witnesses.

THOMAS W. SPELLMAN.

Witnesses:
PHILIP W. SOUTHGATE,
LOUIS W. SOUTHGATE.